(12) United States Patent
Dudley

(10) Patent No.: US 10,972,030 B2
(45) Date of Patent: Apr. 6, 2021

(54) MULTI-STAGE SYNCHRONOUS GENERATOR

(71) Applicant: Labinal Power Systems, Blagnac (FR)

(72) Inventor: Neil Dudley, Essex (GB)

(*) Notice: Subject to any disclaimer, the term of this patent is extended or adjusted under 35 U.S.C. 154(b) by 365 days.

(21) Appl. No.: 16/062,817

(22) PCT Filed: Dec. 16, 2016

(86) PCT No.: PCT/EP2016/081616
§ 371 (c)(1),
(2) Date: Jun. 15, 2018

(87) PCT Pub. No.: WO2017/103233
PCT Pub. Date: Jun. 22, 2017

(65) Prior Publication Data
US 2020/0266742 A1    Aug. 20, 2020

(30) Foreign Application Priority Data
Dec. 18, 2015   (GB) .................................... 1522395

(51) Int. Cl.
| | | |
|---|---|---|
| H02P 9/48 | (2006.01) | |
| H02P 9/00 | (2006.01) | |
| H02P 101/25 | (2016.01) | |
| H02P 101/30 | (2015.01) | |
| F01B 23/10 | (2006.01) | |
| B64D 41/00 | (2006.01) | |

(52) U.S. Cl.
CPC ................ *H02P 9/48* (2013.01); *B64D 41/00* (2013.01); *H02P 9/006* (2013.01); *F01B 23/10* (2013.01); *H02P 2101/25* (2015.01); *H02P 2101/30* (2015.01)

(58) Field of Classification Search
CPC ........ H02P 9/006; H02P 9/48; H02P 2101/25; H02P 2101/30; B64D 41/00; F01B 23/10
USPC .................................. 322/24, 25, 28; 290/31
See application file for complete search history.

(56) References Cited

U.S. PATENT DOCUMENTS

| | | | | |
|---|---|---|---|---|
| 3,768,002 A | * | 10/1973 | Drexler | ..................... H02P 9/38 |
| | | | | 322/25 |
| 5,170,065 A | * | 12/1992 | Shimizu | .................. F02D 29/06 |
| | | | | 290/40 A |
| 5,430,362 A | * | 7/1995 | Carr | ........................ F02N 11/04 |
| | | | | 318/139 |

(Continued)

FOREIGN PATENT DOCUMENTS

| | | |
|---|---|---|
| EP | 1063764 | 12/2000 |
| EP | 2808996 | 12/2014 |

OTHER PUBLICATIONS

International Search Report and Written Opinion dated Mar. 23, 2017, 12 pages.
U.K. Search Report dated May 26, 2016, 3 pages.

*Primary Examiner* — Pedro J Cuevas
(74) *Attorney, Agent, or Firm* — Rankin, Hill & Clark LLP (57) ABSTRACT

The disclosed embodiments aim to improve upon existing multi stage generators for providing power to a load. In particular, embodiments of the invention include a regulator situated between the output of a pilot exciter and the main exciter of a multi stage generator system, the regulator arranged to limit the voltage available to a field current control element which sets the field current supplied to the main exciter.

14 Claims, 5 Drawing Sheets

(56) References Cited

U.S. PATENT DOCUMENTS

| | | | | |
|---|---|---|---|---|
| 5,726,559 A * | 3/1998 | Taniguchi | H02J 7/24 | 322/34 |
| 5,880,533 A * | 3/1999 | Arai | H02P 9/30 | 290/31 |
| 6,628,005 B2 * | 9/2003 | Nelson | F01D 15/10 | 290/40 C |
| 6,700,356 B1 * | 3/2004 | Dorn | H02P 9/305 | 322/44 |
| 6,909,262 B2 | 6/2005 | Yao et al. | | |
| 7,687,928 B2 * | 3/2010 | Taneja | H02K 19/38 | 290/36 R |
| 7,990,085 B2 * | 8/2011 | Furukawa | H02P 9/10 | 318/142 |
| 8,148,834 B2 * | 4/2012 | Huang | H02K 19/38 | 290/31 |
| 8,334,678 B2 * | 12/2012 | Aoyama | H02P 9/305 | 322/28 |
| 8,358,111 B2 * | 1/2013 | Rozman | H02P 9/307 | 322/46 |
| 8,618,776 B2 * | 12/2013 | Horihata | H02P 9/48 | 322/24 |
| 9,199,588 B2 * | 12/2015 | Pallares | B60R 16/03 | |
| 9,716,456 B2 * | 7/2017 | Maruyama | H02K 1/26 | |
| 9,927,473 B2 * | 3/2018 | Ge | G01R 25/00 | |
| 10,498,271 B2 * | 12/2019 | Kim | F02D 41/1404 | |
| 10,797,574 B2 * | 10/2020 | Turvey | H02P 9/006 | |
| 2003/0057706 A1 * | 3/2003 | Nelson | F01D 15/10 | 290/52 |
| 2003/0085691 A1 | 5/2003 | Yao et al. | | |
| 2004/0113592 A1 | 6/2004 | Adams | | |
| 2008/0093850 A1 * | 4/2008 | Taneja | H02K 1/32 | 290/36 R |
| 2008/0303459 A1 * | 12/2008 | Furukawa | B60L 50/16 | 318/142 |
| 2010/0225284 A1 * | 9/2010 | Aoyama | H02P 9/305 | 322/19 |
| 2011/0156664 A1 * | 6/2011 | Horihata | H02P 9/48 | 322/24 |
| 2012/0101640 A1 * | 4/2012 | Stapelfeldt | F03D 7/0284 | 700/287 |
| 2012/0104754 A1 * | 5/2012 | Rudolf | H01H 9/547 | 290/44 |
| 2013/0293194 A1 * | 11/2013 | Pallares | H02P 9/48 | 320/109 |
| 2015/0091606 A1 * | 4/2015 | Ge | G01R 35/00 | 324/765.01 |
| 2015/0311848 A1 * | 10/2015 | Maruyama | H02P 9/48 | 318/490 |
| 2016/0041567 A1 * | 2/2016 | Ko Thet | H02P 9/42 | 290/7 |
| 2019/0052209 A1 * | 2/2019 | Kim | H02P 9/04 | |
| 2019/0212038 A1 * | 7/2019 | Senf, Jr. | F25B 41/043 | |
| 2020/0204097 A1 * | 6/2020 | Augsburger | H02P 9/007 | |
| 2020/0266742 A1 * | 8/2020 | Dudley | H02P 9/10 | |

* cited by examiner

MULTI-STAGE SYNCHRONOUS GENERATOR

FIELD OF THE INVENTION

The invention relates to a synchronous generator system, and in particular to variable speed generator systems used in aircraft.

BACKGROUND OF THE INVENTION

Typically, in gas turbine driven generators, rotational energy is provided to the generator rotors as a function of the speed of the turbine(s) driving the generator. In the context of an aircraft, for example, the rotational speed of the engine varies between ground idle (low speed), take off (high speed) and cruise (medium speed). This means that the generator operates over a range of input speeds. Many aircraft use constant frequency generators, with a speed changer interposed between the engine and generator, in order to provide the required electrical output within a range of acceptable frequencies, for the electrical equipment powered by the generator to function properly.

It is beneficial in many applications, and particularly in aircraft, for generators to be as lightweight as possible, and so variable speed generators can be advantageously used, since they can remove the need for a mechanical speed changer between the turbine, or other prime mover, and the generator. Omission of the mechanical speed generator can reduce weight, cost and complexity, and potentially increases system reliability whilst decreasing the need for routine servicing.

Although the electrical load driven by generators can be readily designed to cope with a range of input frequencies inherent to the variable output of a generator, one problem posed by such generators is that the output voltage of the generator can vary, depending particularly on rotational speed and the electrical load on the generator. If the output voltage exceeds the operating limits of the electrical equipment, faults can arise. If the generator's output voltage is too low, the electrical components in the system making up the load may not function correctly.

A variable speed generator therefore needs to be designed so that it can deliver the designed output voltage at minimum speed and maximum load. An example of this situation in the context of aircraft would be when the aircraft is in the ground idle state, and all electrical systems are engaged.

At low loads and high speed, in contrast, the generator can provide much more than the designed output voltage. For example, in an example of a typical system, the generator can provide its maximum output voltage when a field current of 2 A is provided to the main exciter. At full rotational speed, however, the pilot exciter can provide up to 12 A.

Figure 1:
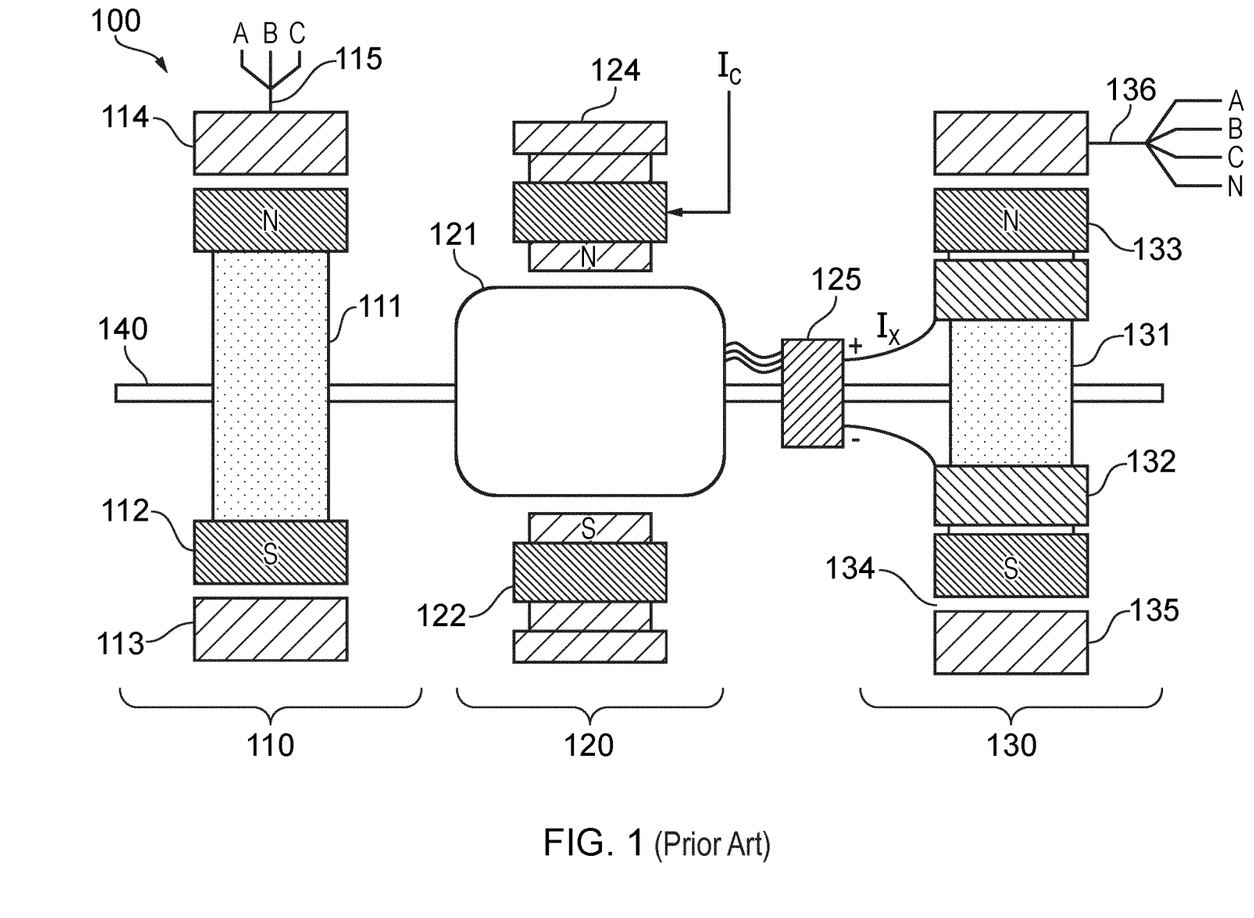
FIG. 1 shows an overview of a prior art generator system.

FIG. 1 shows a conventional three-stage generator as known for converting mechanical rotation, such as from an output shaft of a turbine, into electrical power for use in electrical systems. The generator 100 comprises a first stage 110, a second stage 120, and a third stage 130, which in the example shown are all coupled to a shaft 140, which may be driven by a turbine (not shown).

The first stage 110 is a pilot exciter. A pilot exciter is a source of electrical power for the subsequent stage exciter coil. It may be a small AC generator with a rotor 111 having permanent magnets 112, mounted on rotor shaft 140, and having a three-phase winding on a stator 113, 114. The output 115 of the pilot exciter 110 is a three phase electrical signal, designated by lines 15A, 15B, 15C. The pilot exciter can be included on a generator shaft 140 in order that no external electric power is required to provide a voltage to the main exciter. The pilot exciter may be a permanent magnet exciter as shown in FIG. 1, or alternatively other systems for providing power to the main exciter are equally possible. Permanent magnet exciters of the kind illustrated will be known to the skilled reader and so are not described in detail herein.

As can be seen in FIG. 1, second stage 120 may be provided as a main exciter 120, and may comprise a rotor 121 mounted on shaft 140. The main exciter field current $I_C$ is applied to field winding 122. Field winding 122 is situated on stator 124. Application of field current $I_C$ to the main exciter is necessary to power the field windings 122, so that the operation of main exciter 120 generates the required field current for the third stage 130. The rotation of rotor 121 within the field provided by the field current $I_C$ applied to field winding 122 of stator 124 produces the output of the main exciter, which is provided to the third stage 130 of the generator 100. An increase in the field current $I_C$ applied to the main exciter will evidently increase the current which is present at the output of the main exciter. Located at the output of the main exciter 120 is a three-phase bridge rectifier 125. The bridge rectifier 125 is connected to the third stage 130 of the generator 100 in order to provide rectified exciting current h. The main exciter 120 in FIG. 1 is a brushless exciter, although other configurations are possible, such as a slip-ring exciter, for example.

The third stage 130 of generator 100 is an alternator comprising a rotor 131 mounted on shaft 140. Located on rotor 131 are exciting coil 132 and poles 133. Rotor assembly 131, 132, 133 rotates within stator 135. Air gap 134 is provided between the rotor and stator 135. The output 136 of the alternator 130 can be seen to have three phase terminals and a neutral terminal. The rectified field current $I_x$ received from the second stage main exciter 120 is provided to main field circuit 132, 133. The output voltage of the generator at output 136 of armature 135 is dependent on the field current $I_x$ supplied to the exciting coil 132 located on rotor 131.

As stated above, it is desirable to ensure that the main output 136 of the generator 100 does not deviate too far from the desired level during operation of the generator at different rotational speeds. In order to control the output voltage, a generator control unit (GCU) is provided as a control element between the output of the permanent magnet generator pilot exciter and the main exciter field. The function of the GCU control element is to ensure that the main exciter is provided with a field current $I_C$ in such a way that the output of the generator remains within the tolerance required for a connected load to operate.

Figure 2:
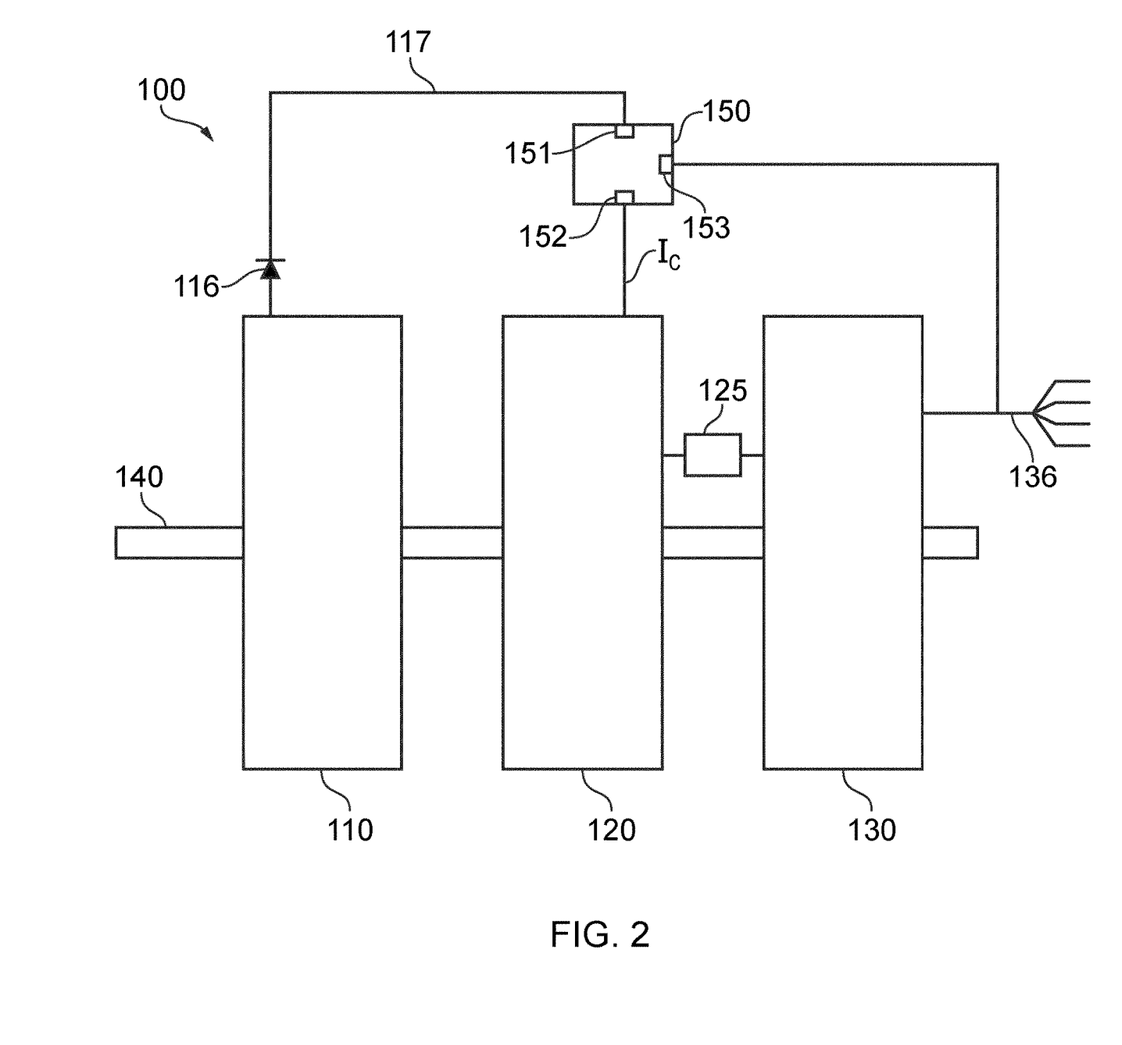
FIG. 2 shows a schematic of the prior art generator system.

FIG. 2 shows a system comprising a GCU field current control element. As can be seen in FIG. 2 the output terminal of the first stage 115 is passed to the field winding of the main exciter via a circuit including diode rectifier 116, and a GCU field current control element 150. Rectifier 116 is shown as a diode rectifier, although it will be appreciated that different rectifiers could be used for the purpose of rectifying a signal output of the PMG pilot exciter 110. The rectified output of the pilot exciter 110 is then passed directly to GCU 150. It can also be seen in FIG. 2 that a signal indicative of the output of the third stage of generator 100 is connected to an input 153 of the GCU 150. In this way, GCU 150 can regulate the field current $I_C$ input to main exciter 120 in response to the measured output of the generator 100, to ensure that the required operational characteristics, such as output current and/or output voltage, are maintained.

The exciter field current $I_C$ can be reduced by the control element 150 when the main output of the generator is above the desired voltage to reduce the main output voltage. The control element 150 can increase the field current $I_C$ when the main output is lower than required to increase the main output voltage. If the control element 150 fails such that the output voltage is too low, a GCU, or other power management system, can disconnect the generator from the aircraft electrical system, and the loads that were fed by that generator are typically fed from an alternative power source, such as a secondary generator. If the control element fails where the output voltage is too high, there is a potential for the load fed by the generator to be overloaded.

For example at a high engine speed in a low load condition, if the control element 150 fails in such a way that the full rectified permanent magnet generator exciter current is applied to the field winding, the output voltage of the generator 100 may rise very rapidly to undesirable levels. Under these circumstances, the design of a protection circuit to detect the failure, and prevent excessive voltage being applied to the load sufficiently quickly and reliably, becomes technically challenging.

In the event of a failure of a GCU field current control element in known systems, safety devices located at the output of the generator have to react very quickly to take mitigating action such as disconnecting the generator from any loads at risk from damage by over-voltage. In the event of the output voltage exceeding a predefined threshold or limit, the main output of the generator can be shorted. Such a circuit must be designed to act very rapidly in order that load equipment is not damaged, such a "crow bar circuit" may be effective at safeguarding load equipment. A circuit at the output of the generator may have to act within 1 ms or less to disconnect the generator from the load to avoid damage to the load equipment, and therefore necessarily must include complex circuitry. In systems where weight is critical, such an output based safety device, which may weigh several kilos, is not necessarily ideal.

SUMMARY OF THE INVENTION

Embodiments of the present disclosure aim to improve upon systems for a multi-stage synchronous generator, in particular reducing the overall weight of the system while maintaining a system which operates within tightly controlled performance limits. This is particularly important in aircraft power generator systems. A voltage regulator is introduced into the field current supply line which provides the field current to a main exciter of the generator. By limiting the electrical power available to a generator control unit (GCU) element, via a limited voltage or current, the consequences of a failure of the GCU element can be mitigated.

According to a first aspect of the invention, there is provided a multi-stage, synchronous generator comprising a first stage, a second stage, a field current supply path, connecting an output of the first stage to a field current input of the second stage, to provide a field current to the second stage, wherein the supply path comprises a field current control element arranged to control the current supplied to the second stage in response to an output of the generator, and a regulator, located between the output of the first stage and the field current control element, and arranged to limit a current and or voltage supplied to the field current control element by the first stage.

By limiting the electrical signal available to the field current control element, the exciter field current which can be generated will not rise to unacceptable levels in the event of a failure of the field current control element. This means that circuitry for compensating for an over-voltage at the output of the generator may not be required in the system, or may be simplified, thereby reducing the weight and the complexity of the system.

The regulator may be arranged to regulate or limit the voltage supplied to the field current control element. Further, the regulator may be arranged to regulate the voltage supplied to the field current control element in response to the rotational speed of the generator. In this way, the voltage supplied to the field current control element can be adjusted to follow a particular function related to the speed of the generator, which allows the field current control element to function in an optimised manner. In effect, this means that the input to the field current control element can be tuned, based on the rotational speed of the generator.

The regulator may be arranged to provide a constant voltage to the field current control element. This arrangement makes the voltage available to the field current control element independent of the rotational speed of the generator, providing a lightweight and low cost solution to the problems presented by the prior art.

The regulator may be arranged to limit a voltage provided to the field current control element so as to limit a maximum field current which can be provided by the field current control element to the second stage at a given rotational speed.

The regulator may be further configured to limit a voltage provided to the field current control element. This can limit a maximum field current which can be provided by the field current control element to the second stage at a given rotational speed, even when the field current control element passes the field current substantially uninhibited to the second stage. The rotational speed dictates the voltage which is provided to the field current control element, and the supplied voltage can be adjusted by the regulator for each rotational speed. This can allow the field current control element to operate in a fully "on" mode, in which it allows the signal from the regulator to pass to the main exciter in such a way that the field current control element does not affect the signal, without significant drawbacks to the system performance.

The regulator may be arranged to regulate the voltage supplied to the field current control element as a function of a temperature of the generator. The operational temperature of the generator can affect the resistance, and therefore the current output of the exciter at a given voltage, which in turn affects the maximum output voltage of the generator. Providing a temperature-based signal to the regulator from the generator allows the maximum exciter current to be controlled via a voltage input, in response to a temperature of the generator. This can help to ensure that only a desired maximum output voltage of the generator is delivered under varying temperature conditions, by limiting the voltage delivered to the second stage exciter, taking into account the temperature of the generator, or of the exciter coil itself.

The regulator may be arranged to regulate the voltage supplied to the field current control element as a function of the temperature of the exciter coil.

The generator may further comprise a sensing means for sensing a first condition in the field current supply path, between the regulator and the field current control element, to detect whether the output of the regulator exceeds a predetermined threshold. By detecting when the output of the regulator exceeds a particular threshold, a fault in the regulator does not go undetected. The operator of the generator is therefore not under the impression that the system is operating properly when in fact the full rectified pilot exciter voltage might be applied to the main exciter in the event of a field current control element failure.

The sensing means may detect the voltage output of the regulator. The sensing means may be arranged to detect a second condition, being indicative of the signal output of the regulator being substantially equal to the signal input to the regulator.

The sensing means may be further arranged, upon detection of the first and/or second condition, to alert a user of a fault condition.

The sending means may be further arranged, upon detection of the first and/or second condition, to isolate the generator from a load.

The regulator may be arranged to regulate the current supplied to the field current control element.

The regulator may be arranged to regulate the current supplied to the field current control element as a function of the rotational speed of the generator.

The first stage may be a pilot exciter, and the pilot exciter may be mounted on a drive shaft of the generator.

The field current supply line may further comprise a rectifier at the output of the pilot exciter, and the rectifier may be a diode rectifier.

The pilot exciter may be a permanent magnet exciter. The output of the pilot exciter may be a three phase electrical output.

The second stage may be a main exciter of the generator. The main exciter may be mounted on a drive shaft of the generator, and the main exciter may be a brushless exciter.

The generator may further comprise a rectifier at the output of the second stage, and the rectifier may be a three-phase bridge rectifier.

The generator may comprise a third stage, and third stage may be an alternator. The main output of the generator may be the output of the alternator.

The generator may be an aircraft power generator.

The field current control element may be a switched-mode power supply.

Further features and advantages of embodiments of the invention will be apparent from the appended claims and the following detailed description.

BRIEF DESCRIPTION OF THE DRAWINGS

Further features and advantages of the present invention will become apparent from the following description of an embodiment thereof, presented by way of example only, and by reference to the drawings, wherein like reference numerals refer to like parts, and wherein.

DETAILED DESCRIPTION OF EMBODIMENTS

Figure 3:
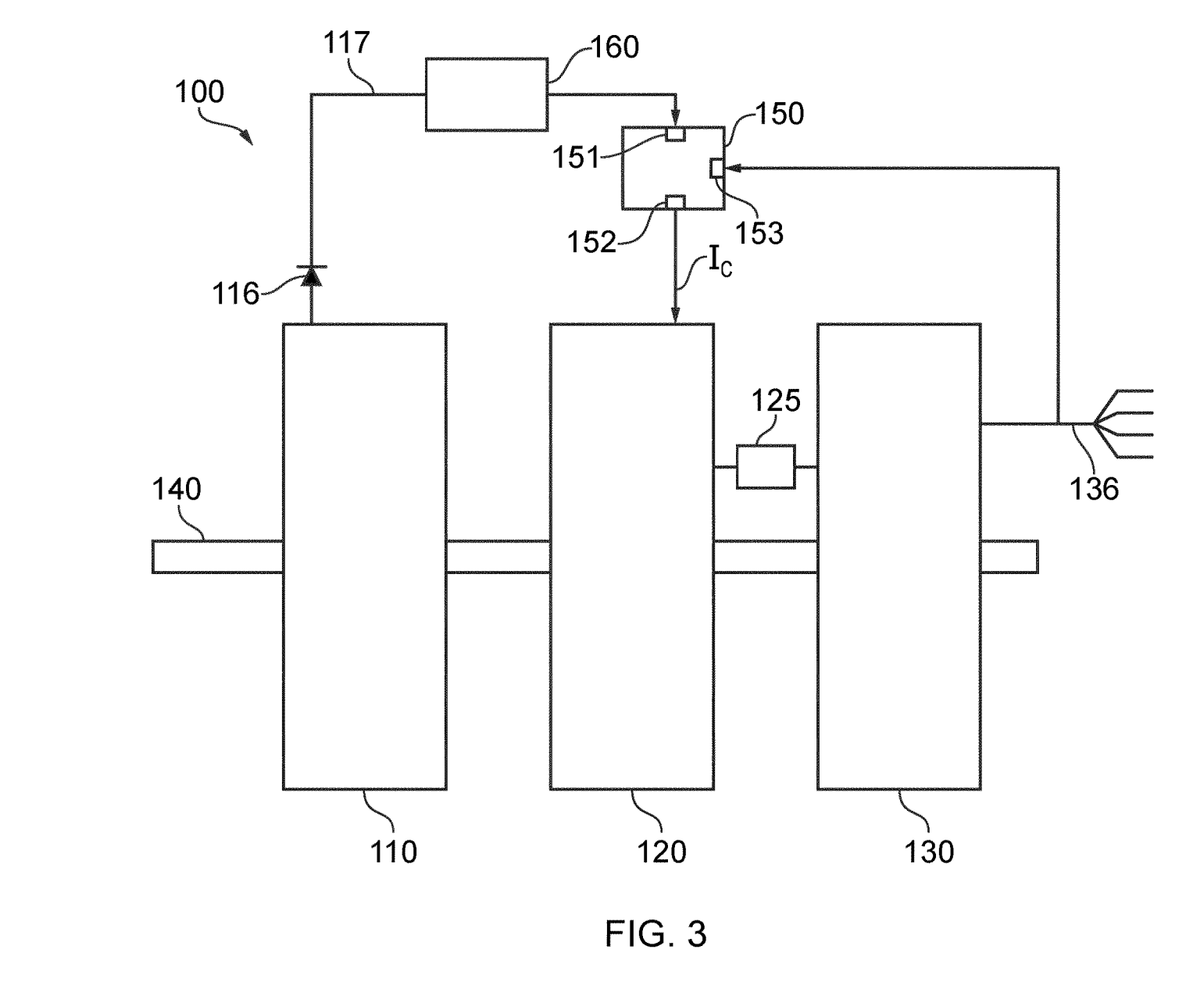
FIG. 3 shows an example of a generator according to the present invention.

FIG. 3 shows an example of a multistage synchronous generator according to the present invention. It comprises a first stage 110, a second stage 120 and a third stage 130. In the embodiment shown in FIG. 3 the first stage 110, second stage 120 and third stage 130 are all mounted on input shaft 140, although examples of the invention can be implemented using any plurality of stages comprising a first stage, for providing an exciter current to a second stage of the plurality. A field current supply line 117 links an output of first stage 110 and the second stage 120. A rectifier 116 is preferably present in the field current supply line at the output of the first stage 110. Rectifier 116 is preferably a diode rectifier but can take the form of any component or system suitable for rectifying an alternating output of the first stage 110. If, for example, the first stage provides a direct current, then rectifier 116 may not be necessary. The field supply line also comprises a regulator 160 and generator control unit (GCU) 150, which is a control element. The output of regulator 160 is connected to control element 150 at an input 151. Field current $I_C$ is supplied from output 152 of control element 150 to an input of second stage 120. A signal representative of the output 136 of the generator, preferably an output voltage, and more specifically an output voltage of an output of third stage 130, is connected to a further input 153 of the control element 150. An output of second stage 120 is connected to third stage 130 via a rectifier 125.

The first stage 110 of generator 100 is preferably a pilot exciter. The first stage pilot exciter 110 may take the form of the prior art example shown in FIG. 1, although it will be appreciated that many configurations for a pilot exciter exist which could perform the necessary function. For example, pilot exciter 110 need not be mounted on the shaft 140 and could be provided with a separate source of power in certain applications. In the context of a multistage synchronous generator in accordance with the present example, the output of the pilot exciter relates to the rotational speed of shaft 140. The output voltage of pilot exciter 110 may therefore be higher at a faster rotational speed of shaft 140.

In prior art systems such as that shown in FIG. 2, the unregulated DC output of first stage pilot exciter 110 is applied directly to control element 150. A failure of control element 150 can result in excessive output voltage from the generator due to an uncontrolled field current being provided to the main exciter. Subsequently, the exciting current provided to the alternator 130 may be higher than under normal operating conditions, and this can be particularly problematic at maximum rotational speed, since the main output voltage of the generator can increase rapidly. As mentioned above, excessive output voltage from the generator can damage the system components drawing the load, which is generally undesirable.

As can be seen in FIG. 3, a regulator 160 may be located between the output of first stage 110 and control element 150 and more preferably between the rectifier 116 and control element 150. The regulator 160 can act to limit or reduce the maximum output from the generator as a whole, by making the available voltage for the field current $I_C$ independent of generator rotational speed. Limiting this current can also help to reduce the rate at which the main output voltage of the generator increases with rotational speed of the generator. In certain embodiments, the voltage that provides the excitation current $I_C$ can be made constant with regulator 160 being a voltage regulator. Constant voltage being applied to the control element can reduce the ability of the generator to be able to generate excessive voltages at high speeds in the case of a GCU failure, but does not necessarily eliminate it. This is because the main generator stage 130 will still be able to produce a greater output at higher speeds with a given level of excitation, although as stated above, limiting the excitation current as described can reduce the rate at which the generator output increases. In other words, the system of the present invention reduces the risk of a generator producing excessive voltages at high speeds, but does not of itself necessarily result in the output of the generator is entirely independent of rotational speed.

In FIG. 3 regulator 160 can output a constant voltage to CGU control element 150. In general control element 150 provides the excitation current $I_C$ to second stage 120 in dependence on the voltage output of generator 100 which is received at input 153. If the voltage output of the generator 100 increases above a desired limit, the control element 150 can act to lower the excitation current $I_C$ applied to 120, which will therefore lower the output voltage due to the diminished excitation current applied in turn to alternator 130 by second stage 120. When control element 150 is supplied with a constant voltage input which is limited to a predetermined maximum by regulator 160, if control element 150 should fail, especially at a high rotational speed, the danger of damaging connected loads or load circuitry is greatly reduced, since main generator output voltage increases will be less rapid when the constant voltage is applied. These can therefore be detected more effectively by over-voltage protection equipment downstream of the generator output, and appropriate action taken if necessary.

Figure 4:
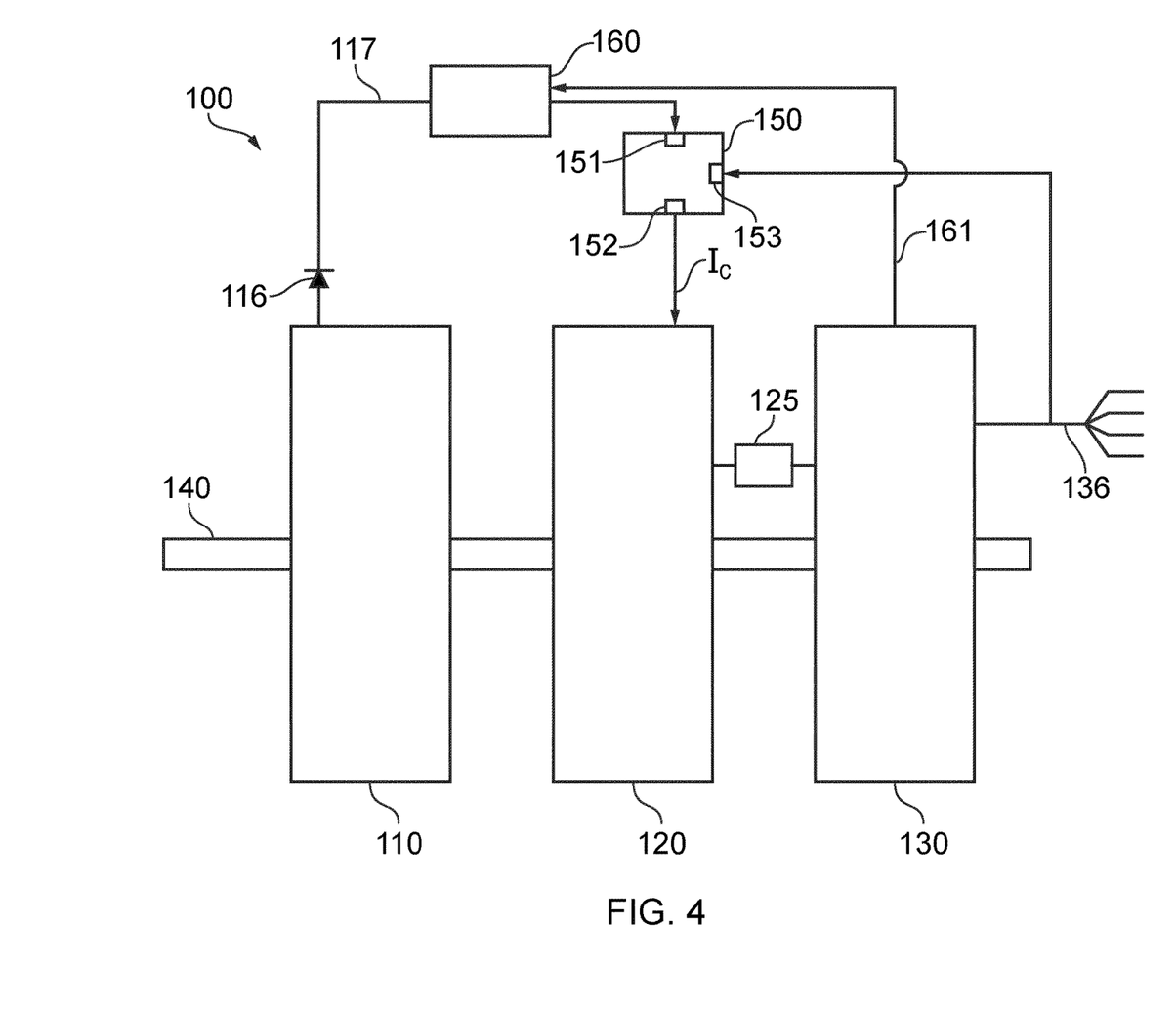
FIG. 4 shows an example of a generator employing a speed dependent regulator according to the present invention.

FIG. 4 shows an embodiment in which regulator 160 is connected to an output of the third stage 130. In the embodiment of FIG. 4, a signal indicative of a speed of rotation of at least one stage of the generator is connected to regulator 160, and a signal indicative of the electrical output of regulator 160 is connected to the input 151 of control element 150. The regulator 160 receives output from the first stage pilot exciter 110 as described in relation to earlier examples.

The connection 161, which may be provided from the third stage 130 as illustrated, provides the regulator 160 with a signal indicative of the rotational speed of the generator. The regulator 160 is arranged to provide a variable voltage to control element 150, which varies according to the present rotational speed of the generator. The fact that the regulator can regulate the voltage supplied to the field current control element 150 in response to the rotational speed of the generator means that the regulated PMG voltage can be arranged to effectively track a required function based on rotational speed. The function may be linear or non-linear and can be configured to reduce the delivered voltage with an increase in detected rotational speed. This is because at higher rotational speeds, the third stage can generate the necessary output voltage with a lower exciting current. Any voltage provided to the control element 150 beyond this required current is effectively redundant and can represent a risk in the event of failure of the control element 150, as described above.

The required function can be defined such that at each rotational speed within the operational range of the system, the generator can only deliver the maximum desired output current at the designed output voltage, even with the control element 150 fully "on", i.e. in the event of such a failure condition in the control element 150. Due to the rotational inertia of the generator rotor and engine parts which are mechanically coupled to it, over a short time interval, for example 100 milliseconds, generator speed can be considered as constant. The output of the voltage regulator can therefore be changed with a corresponding time constant of, for example, 100 ms or less, and therefore the regulator can be arranged such that a regulated voltage is provided to the control element, which is limited to the maximum required by the second stage under normal operating conditions for a given rotational speed.

Otherwise stated, the regulator 160 provides a voltage to the control element 150 such that the generator can deliver a maximum threshold output voltage at a given current rotational speed, even with the control element 150 allowing the output of the regulator to pass substantially unimpeded from the regulator 160 to the field current input at the second stage main exciter 120.

The main generator output voltage depends on the main exciter current, whilst the maximum generated current in the second or third stages is dependent on the available input voltage to that stage and the relevant exciter coil resistance. Since the exciter coil resistance will vary with the temperature of the coil, this means that the maximum current in the exciter coil is also influenced by the temperature of the coil, and so can be considered temperature dependent.

Figure 5:
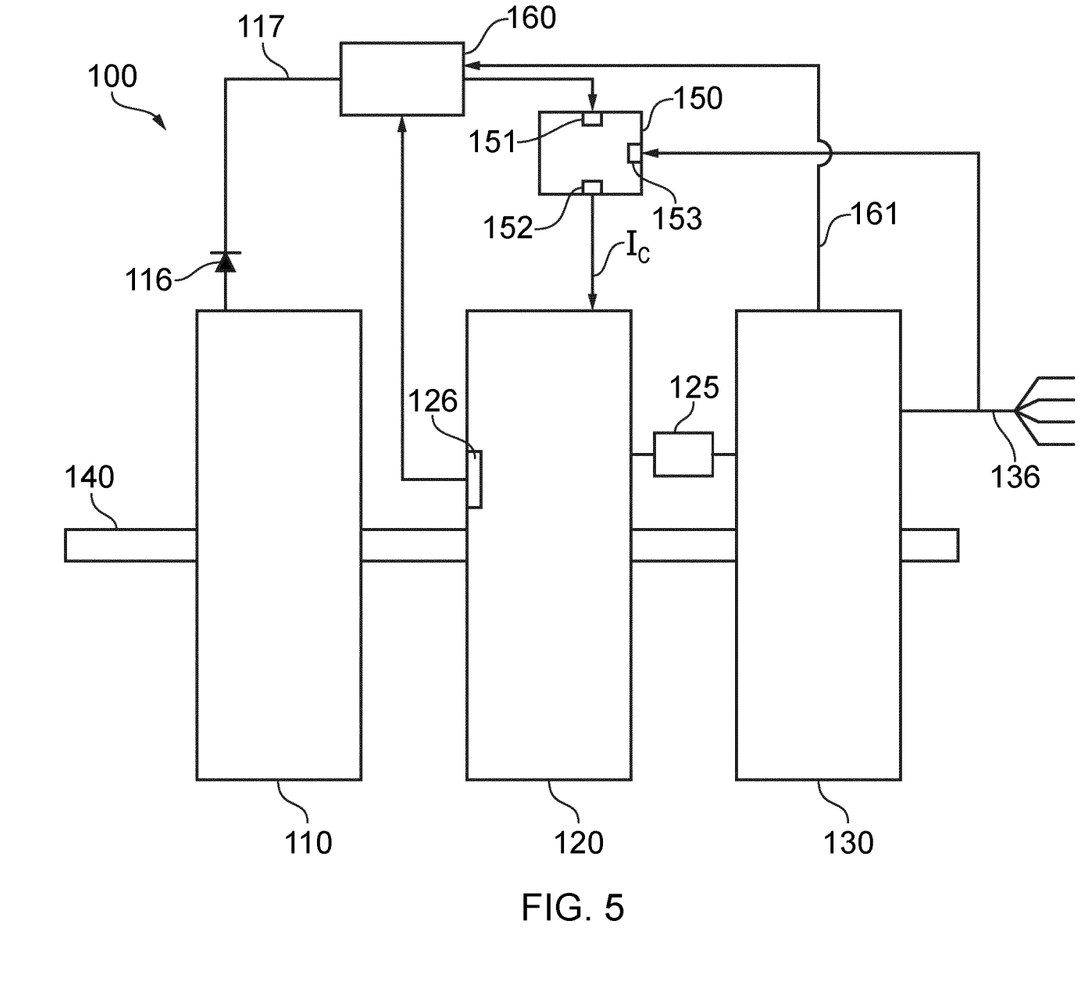
FIG. 5 shows an example of a generator in which the regulator is dependent on temperature and/or speed of the generator.

FIG. 5 shows a further example of a multistage generator according to an aspect of the present invention, comprising a multi-stage generator as provided in FIG. 4, and further comprising a temperature sensor 126 arranged to detect a temperature of the generator, and which may be located in the second stage 120 as illustrated. The regulator 160 has a connection 161 to an output signal from the generator, and also a connection to temperature sensor 126 located within the second stage 120. The regulator 160 is therefore operable to control its electrical output in response to signals received from these two connections. The regulator 160 can be arranged such that the regulated PMG output voltage of the first stage 120 can be adjusted to compensate for the temperature sensed by temperature sensor 126.

In practice, the PMG voltage can vary in relation to the rotational speed of the generator by amounts up to around 100 to 150%. The regulator can be configured to accommodate this by adjusting the voltage supplied to the control element 150 in response to a sensed speed of rotation of the generator, or of pilot exciter, which may relate to a speed of rotation of the generator in configurations where each stage is on a common shaft.

The temperature variation of the exciter coil can affect the current output provided by the second stage by a factor of around 20%, and the regulator can be arranged to compensate for this variation. The voltage supplied to the control element is therefore optimised for the system running at different rotational speeds and also at different operating temperatures.

An alternative to sensing speed and/or voltage is to provide a regulator 160 which is configured to provide a limited current to control element 150. However, if both the control element 150 and the regulator 160 are configured to control current, then it is difficult to determine whether one or the other has failed, since the one of the two which remains functional will provide the required current limitation and detection of failure of one or the other becomes difficult.

Therefore, although compensating for temperature on a voltage regulator in the manner described above increases the complexity of the regulation function, and therefore also the circuitry required, using a voltage regulator at regulator 160 rather than a current regulator at regulator 160 provides the advantage that the output of the regulator can be frequently checked during operation in order to detect whether a fault has arisen in the regulator. Should the regulator 160 short circuit or develop a fault condition it will not regulate the voltage output from the first stage 110 in the correct way, to provide the appropriate regulated voltage to the control element 150. The output voltage of the regulator 160 can be measured, knowing the expected output voltage of the regulator, be it constant, or dependent on the temperature and/or speed of the system, and the measured voltage can be compared to the expected output voltage. In this way, although the system could function without the regulator, a fault in the regulator does not go unchecked, and can be quickly addressed and/or communicated to a further control system, or to a user, to allow remedial action or isolation of the generator if it is considered a risk. The testing of the regulator output voltage can be carried out by a simple voltage measurement, and compared with the expected output voltage, as may be defined for a given set of rotational speed and temperature conditions.

An alternative embodiment of the invention provides a generator system as shown in FIG. 4, wherein the regulator 160 is configured to adjust the current provided to control element 150, rather than adjusting the field current control voltage, according to rotational speed. The need for compensating for generator exciter coil temperature is thus not required, because with the supplied current being controlled, the current in the exciter coil will be constant regardless of its resistance, which may vary with temperature. In such a system, however, as described above, it is more difficult to ensure that the regulator is functioning correctly with periodic testing throughout operation, since a fault in the regulator would not show as a higher than expected voltage at the output of the regulator.

With the improved schemes described, the control element 150 only has to be adjusted to allow for variations in load current (which may vary according to the load that the generator has to supply and may change rapidly whilst the aircraft is in operation) in order to maintain the desired generator output voltage.

However, in the event of a fault which results in the control element 150 allowing more current than is needed to maintain the desired generator output voltage, the exciter current as regulated by the regulator 160 is constrained to a significantly lower level than would be the case if the control element 150 were fed directly from the first stage, especially at higher rotational speeds of the generator. This lower level of maximum exciter current will limit the maximum rate at which the generator output voltage can increase in the event of a control element fault. A slower rate of increase makes it technically easier to ensure that an over voltage sensing circuit can detect an excessive voltage at the output of the generator and react in time to prevent an unacceptable voltage from reaching loads connected to the generator.

The invention claimed is:

1. A mufti-stage synchronous generator, comprising:
   a first stage;
   a second stage being a main exciter;
   means for determining a rotational speed of the mufti-stage synchronous generator;
   a temperature sensor for measuring a temperature of the mufti-stage synchronous generator;
   a field current supply path, connecting an output of the first stage to an exciter field current input of the second stage, to provide an exciter field current to the second stage;
   wherein the field current supply path comprises:
      a field current control element arranged to control the current supplied to the second stage in response to an output of the multi-stage synchronous generator, and
      a regulator, located between the output of the first stage and the field current control element, and arranged to limit a current and/or voltage supplied to the field current control element by the first stage;
   wherein the regulator is arranged to regulate the voltage supplied to the field current control element in response to the determined rotational speed of the multi-stage synchronous generator and the measured temperature of the multi-stage synchronous generator.

2. The multi-stage synchronous generator of claim 1 wherein the regulator is configured to limit the voltage provided to the field current control element so as to limit a maximum field current which can be provided by the field current control element to the second stage at a given rotational speed.

3. The multi-stage synchronous generator of claim 1 wherein the regulator is configured to limit the voltage provided to the field current control element so as to limit a maximum field current which can be provided by the field current control element to the second stage at a given rotational speed, even when the field current control element passes the field current to the second stage substantially uninhibited.

4. The multi-stage synchronous generator of claim 1, wherein the regulator is arranged to regulate the voltage supplied to the field current control element in response to the determined rotational speed of the multi-stage synchronous generator as a function of a temperature of an exciter coil.

5. The multi-stage synchronous generator of claim 1, further comprising a sensing means for sensing a first condition in the field current supply path to detect whether the output of the regulator exceeds a predetermined threshold.

6. The multi-stage synchronous generator of claim 5, wherein the sensing means detects the voltage output of the regulator.

7. The multi-stage synchronous generator of claim 5, wherein the sensing means is arranged to detect a second condition being indicative of the signal output of the regulator being substantially equal to the signal input to the regulator.

8. The multi-stage synchronous generator of claim 7, wherein the sensing means is further arranged, upon detection of at least one of the first condition and the second condition, to alert a user of a fault condition.

9. The multi-stage synchronous generator of claim 7, wherein the sensing means is further arranged, upon detection of at least one of the first condition and the second condition, to isolate the generator from a load.

10. The multi-stage synchronous generator of claim 1, wherein the regulator is further arranged to regulate the current supplied to the field current control element.

11. The multi-stage synchronous generator of claim 10, wherein the regulator is arranged to regulate the current supplied to the field current control element as a function of the rotational speed of the generator.

12. The multi-stage synchronous generator of claim 1, wherein first stage is a pilot exciter.

13. The multi-stage synchronous generator of claim 12, wherein the pilot exciter is mounted on a drive shaft of the generator.

14. The multi-stage synchronous generator of claim 1, wherein the multi-stage synchronous generator is an aircraft power generator.

* * * * *